(12) United States Patent
Ohno et al.

(10) Patent No.: US 7,021,109 B2
(45) Date of Patent: Apr. 4, 2006

(54) METHOD AND APPARATUS FOR MANUFACTURING SLIP STOPPER

(75) Inventors: Shunji Ohno, Tokyo (JP); Kazumichi Iwasa, Tokyo (JP); Norio Nakajima, Tokyo (JP); Masanori Tsuji, Tokyo (JP); Tsuyoshi Doi, Tokyo (JP); Yoshihisa Kouzu, Tokyo (JP); Hideyuki Miyake, Odawara (JP); Mamoru Sugimoto, Odawara (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 165 days.

(21) Appl. No.: 10/475,166

(22) PCT Filed: Nov. 11, 2002

(86) PCT No.: PCT/JP02/11741

§ 371 (c)(1),
(2), (4) Date: Oct. 17, 2003

(87) PCT Pub. No.: WO03/059548

PCT Pub. Date: Jul. 24, 2003

(65) Prior Publication Data

US 2004/0134251 A1 Jul. 15, 2004

(30) Foreign Application Priority Data

Jan. 9, 2002 (JP) ............................. 2002-002651

(51) Int. Cl.
*B21D 28/10* (2006.01)
(52) U.S. Cl. ...................... 72/325; 72/379.2
(58) Field of Classification Search .................. 72/325, 72/324, 334, 379.2
See application file for complete search history.

(56) References Cited

U.S. PATENT DOCUMENTS

| 2,159,325 | A | * | 5/1939 | Fabrice | ........................ 413/12 |
| 3,111,977 | A | * | 11/1963 | Kruger | ........................ 72/326 |
| 4,043,481 | A | * | 8/1977 | Herbst | ........................ 220/266 |
| 4,154,184 | A | * | 5/1979 | Keller et al. | .................. 413/17 |
| 4,343,119 | A | * | 8/1982 | Bahnfleth | ..................... 52/180 |
| 5,974,851 | A | * | 11/1999 | Farwell | ........................ 72/325 |

FOREIGN PATENT DOCUMENTS

| JP | A 54-155621 | 12/1979 |
| JP | A 55-77941 | 6/1980 |
| JP | U 59-77512 | 5/1984 |
| JP | U 1-68124 | 5/1989 |
| JP | U 4-61151 | 5/1992 |
| JP | A 11-254059 | 9/1999 |
| JP | A 11-347676 | 12/1999 |
| JP | A 2001-71044 | 3/2001 |
| JP | A 2002-45928 | 2/2002 |
| WO | WO 80/02856 | 12/1980 |

* cited by examiner

*Primary Examiner*—Daniel C. Crane
(74) *Attorney, Agent, or Firm*—Oliff & Berridge, PLC (57) ABSTRACT

An easy manufacturing method of a slip stopper, and apparatus therefor, that has a great slip stopping effect and can be used for a location where a problem occurs if a though hole is opened therein. After a protruding portion is formed on a steel plate, by using a first punching die unit, so as to protrude from the upper surface in a plate thickness direction, a concave portion and drain channels are formed in the protruding portion by shear planes that extend substantially perpendicular to the steel plate upper surface and have been half-blanked so as not to open a through hole in the steel plate by using a second punching die unit.

15 Claims, 11 Drawing Sheets

METHOD AND APPARATUS FOR MANUFACTURING SLIP STOPPER

This application claims priority from JP2002-002651, filed Jan. 9, 2002 through PCT/JP02/11741 filed Nov. 11, 2002. The disclosures of the identified documents are enclosed herein by reference thereto.

BACKGROUND OF THE INVENTION

1. Technical Field

The invention relates to the technical fields of a method and an apparatus for manufacturing a slip stopper employed for a construction machine, such as a hydraulic excavator, or other surfaces that need to be non-slip.

2. Background Art

Figure 10A:
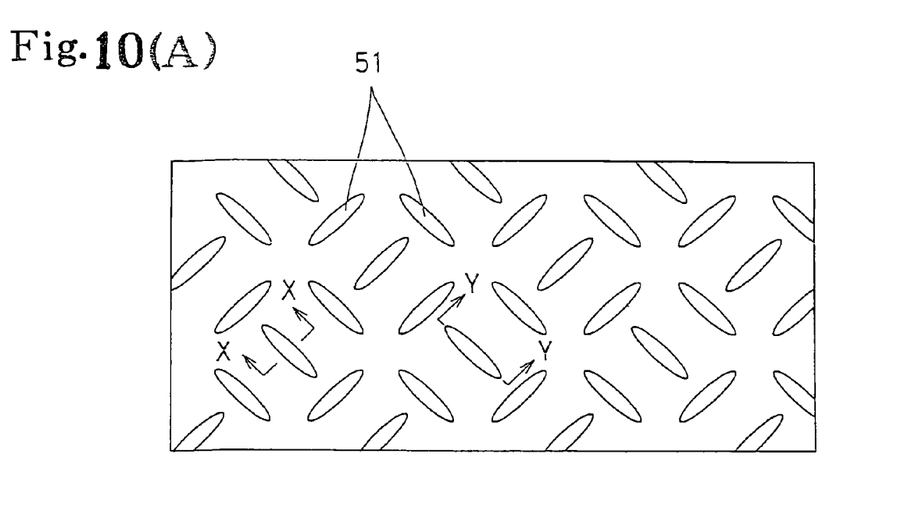
FIG. 10(A) is a plan view of a checkered steel plate.
Figure 10B:
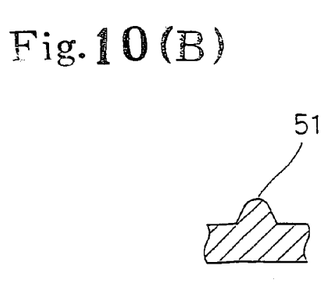
FIG. 10(B) is a 10B–10B sectional view of FIG. 10(A)
Figure 10C:
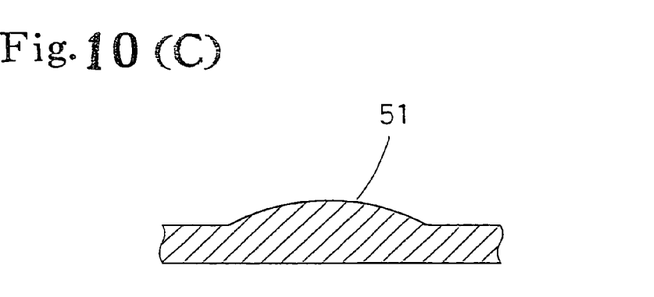
FIG. 10(C) is a 10C—10C sectional view of FIG. 10(A)

Generally, a slip stopper with a slip stopping function is occasionally used for floors, passageways, and stairs in building structures, floors and steps of buses, trucks and special vehicles, decks of railroad vehicles and ships, and scaffolding at construction sites. Such a slip stopper, for example, as shown in FIGS. 10(A)–10(C), has been conventionally known. This is a so-called striped steel plate that has a plurality of projections 51 molded in continuous patterned shape, and a corresponding slip stopping effect can be expected in the case of normal scaffolding. However, the height of the projections 51 of this striped steel plate is low and curved, so that a more reliable slip stopper is required when workers step on a cover covering the upper surface of a construction machine as a stepping surface during maintenance.

Figure 11A:
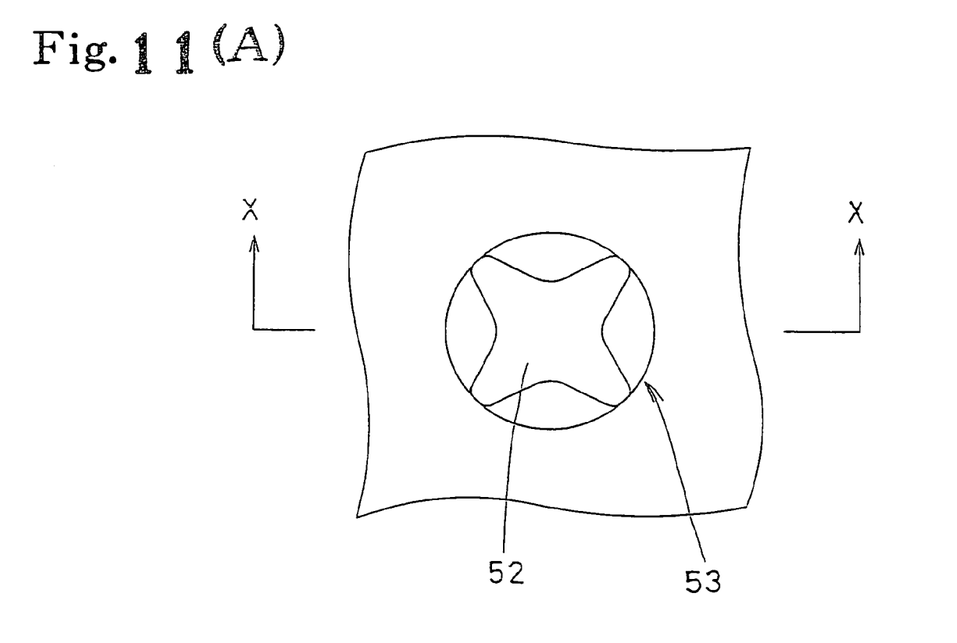
FIG. 11(A) is a plan view of a slip stopping part in which a through hole is opened.
Figure 11B:
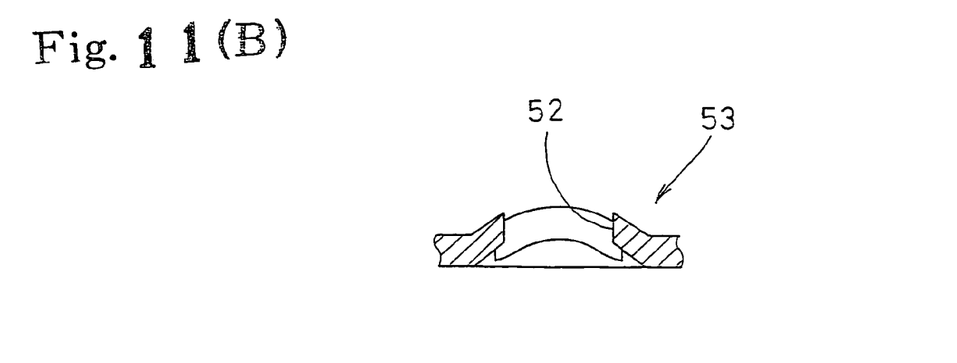
FIG. 11(B) is an 11B—11B sectional view of FIG. 11(A).

Therefore, as shown in FIGS. 11(A)–11(B), a slip stopper for construction machines has been provided in which slip stopping parts 53, having raised edges formed by the marginal portion of a through hole 52 stamped out into a circle shape or a star shape, are formed in a running pattern. In this slip stopper, the raised portions of the slip stopping part 53 can be made sufficiently high, and sharp shear planes are formed by means of the stamping-out process, so that a great slip stopping effect can be obtained.

If the slip stopper having the through hole stamped out is used as it is as a cover to cover the upper surface of a construction machine, problems, such as rainwater or dirt entering the inside of the cover, heated air from an engine blowing upward from the cover, or noise diffusing, are inevitable. Therefore, a double structure in that a flat steel plate is fixed to the lower side of the slip stopper is employed to prevent the abovementioned problems. However, the double structure increases production processes and costs in comparison with the single structure and, further, poses a problem in that mud or dust entering through the through hole of the slip stopper accumulates between the slip stopper and the lower side flat steel plate or in the through hole, and makes cleaning difficult. These problems are solved by the invention.

SUMMARY OF THE INVENTION

In view of the abovementioned circumstances, the invention has been developed to solve the abovementioned problems, wherein after a protruding portion is formed on a plate surface of a metal plate so as to protrude in the plate thickness direction, a concave portion is formed in the protruding portion by shear planes which extend almost perpendicularly to the plate surface of the metal plate and are obtained by half blanking that does not open a through hole in the metal plate.

Thereby, a slip stopper which achieves a great slip stopping effect and can be used for a location where a problem occurs if a through hole is opened therein can be easily manufactured.

Furthermore, the invention comprises a first punching die unit for forming a protruding portion on a plate surface of a metal plate so as to protrude in the plate thickness direction, a second punching die unit for forming a concave portion by shear planes which extend almost perpendicularly to the plate surface of the metal plate and are obtained by half blanking that does not open a through hole in the metal plate.

By using the first and second punching die units, a slip stopper which achieves a great slip stopping effect and can be used for a location where a problem occurs if a through hole is opened therein can be easily manufactured.

The invention can be widely applied in the technical fields of a method and an apparatus for manufacturing a slip stopper for various footings requiring a device to prevent slipping, such as the stepping surfaces of construction machines, floors, passageways, and stairs of building structures, floors and steps of buses, trucks, and special vehicles, decks of railroad vehicles and ships, scaffolding at construction sites, etc. The invention can also be used for a location where a problem occurs if a through hole is opened therein, and is useful in a case where it is necessary to readily manufacture a slip stopper having a great slip stopping effect at low cost.

BRIEF DESCRIPTION OF THE DRAWINGS

The method and apparatus will be described with reference to the drawings, in which.

DETAILED DESCRIPTION

Figure 1:
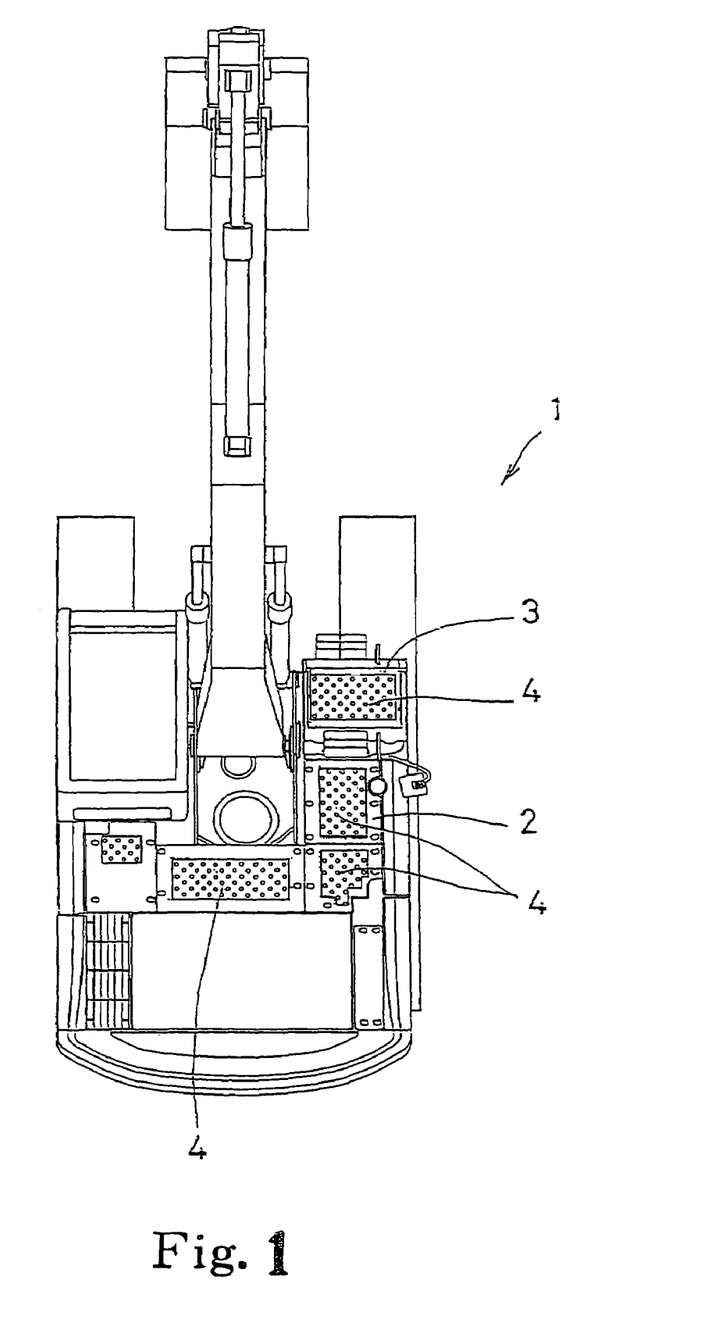
FIG. 1 is a plan view of a construction machine.

In the drawings, a construction machine (hydraulic excavator) 1 is constructed so that the upper surfaces of a cover 2 covering the upper surface of the construction machine body and a tool box 3 are formed as stepping surfaces on which a worker walks and steps during maintenance, and a slip stopper 4 to which the invention has been applied is used on these stepping surfaces.

Figure 2:
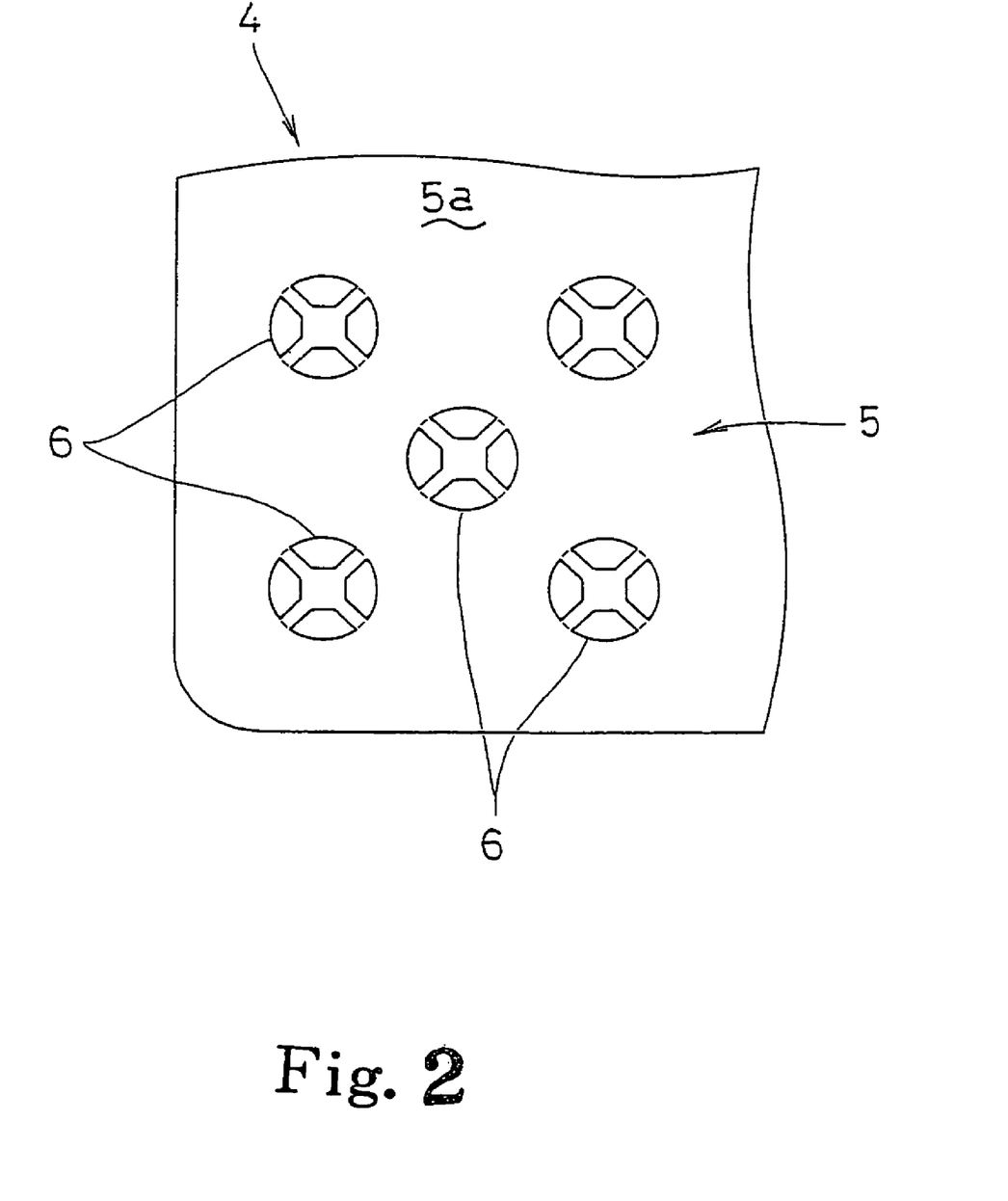
FIG. 2 is a partial plan view of a slip stopper.
Figure 3:
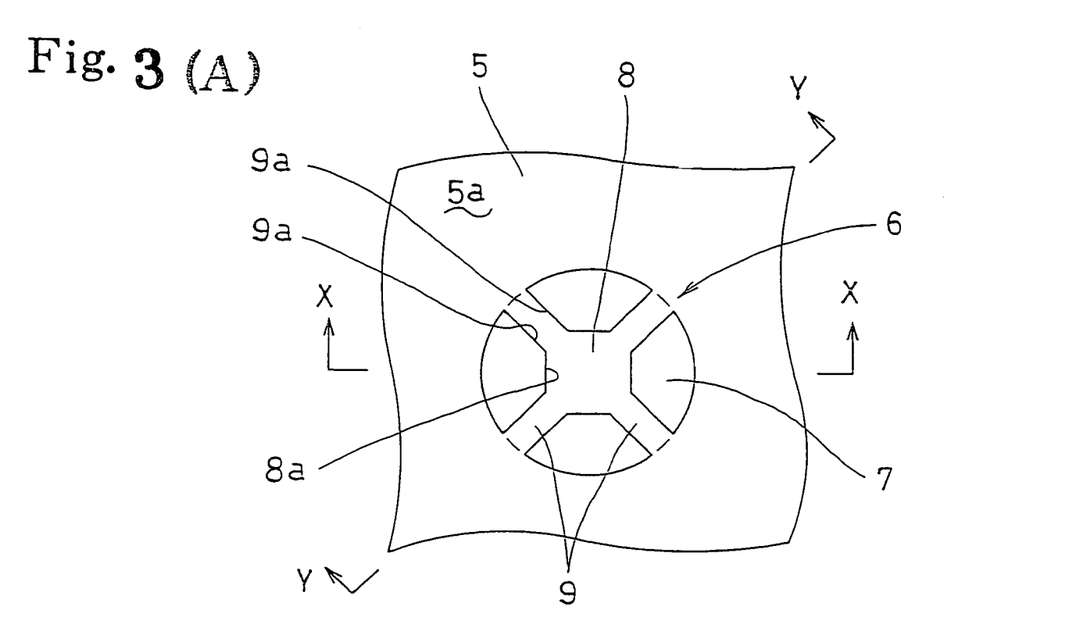
FIG. 3(A) is a plan view of a slip stopping part.
FIG. 3(B) is an 3B—3B sectional view of FIG. 3(A)
FIG. 3(C) is a 3C–3C sectional view of FIG. 3(A)
Figure 4:
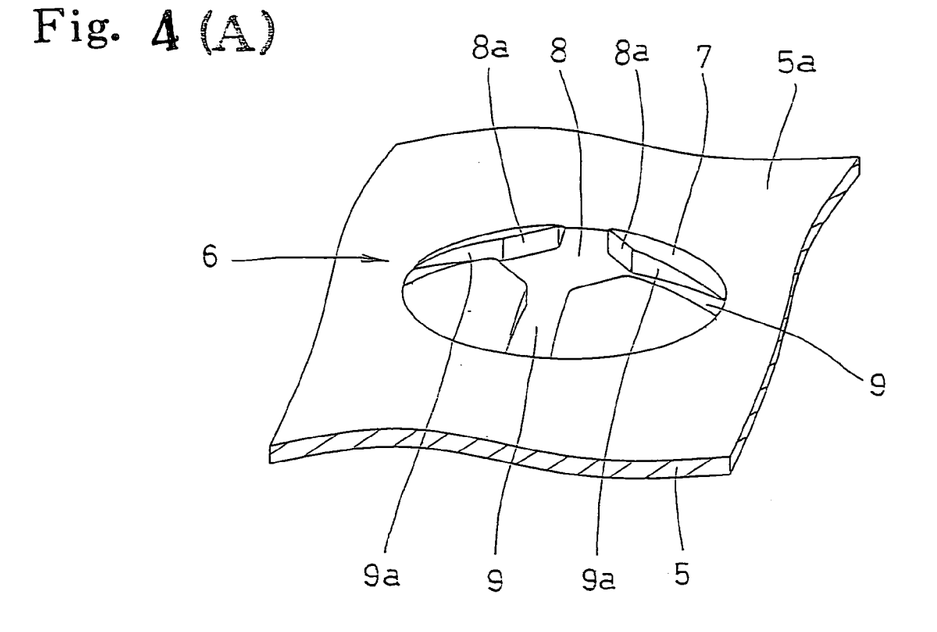
FIG. 4(A) is a perspective plan view of a slip stopping part.
FIG. 4(B) is a perspective bottom view of the slip stopping part.

The slip stopper 4 (FIGS. 2–3(C)) has a plurality of slip stopping parts 6 formed in a vertically and horizontally running pattern on a flat steel plate 5. In the slip stopping parts 6, a concave portion 8 and drain channels 9 are formed in a protruding portion 7, that protrudes in the plate thickness direction from the upper surface 5a of the steel plate 5, by shear planes 8a, 9a described later.

Namely, the protruding portion 7 is circular in a plan view and has a roughly arc-shaped section. A roughly quadrilateral concave portion 8 is formed at the central portion of the upper surface side of this protruding portion 7, and the level of the bottom portion of this concave portion 8 is designed so as to be higher than the upper surface 5a of the steel plate 5. Furthermore, four drain channels 9, that are shaped into concave grooves leading to the upper surface 5a of the steel plate 5 from the concave portion 8, are formed radially, and the groove bottom portions of the drain channels 9 are formed to be inclined from the level which is almost equal to the level of the upper surface of the concave portion 8 at the concave portion 8 side, to become almost equal to the level of the upper surface of the protruding portion 7 at the marginal section of the protruding portion 7 and the upper surfaces of the steel plate 5, i.e., are highest at the concave portion 8 side and lower toward the marginal side of the protruding portion, whereby water or dirt is prevented from accumulating in the concave portion 8. On the other hand, at the lower surface side of the protruding portion 7, portions 8b, 9b that are the back surface sides of the concave portion 8 and the drain channels 9 protrude downward.

Herein, the inner circumferential surface of the concave portion 8 and the groove side surfaces of the drain channels 9 are formed by shear planes 8a, 9a which extend substantially perpendicular to the upper surface 5a of the steel plate 5 and have been half-blanked so as not to open a through hole in the steel plate 5. Furthermore, the shear planes 8a, 9a are sheared so that the upper edges are shaped acutely, that is, acute edges are raised.

To form the slip stopping part 6, after a first process in which a protruding portion 7 is formed using first and second punching die units 10, 11, a second process is carried out in which the concave portion 8 and the drain channels 9 are formed.

Figure 5:
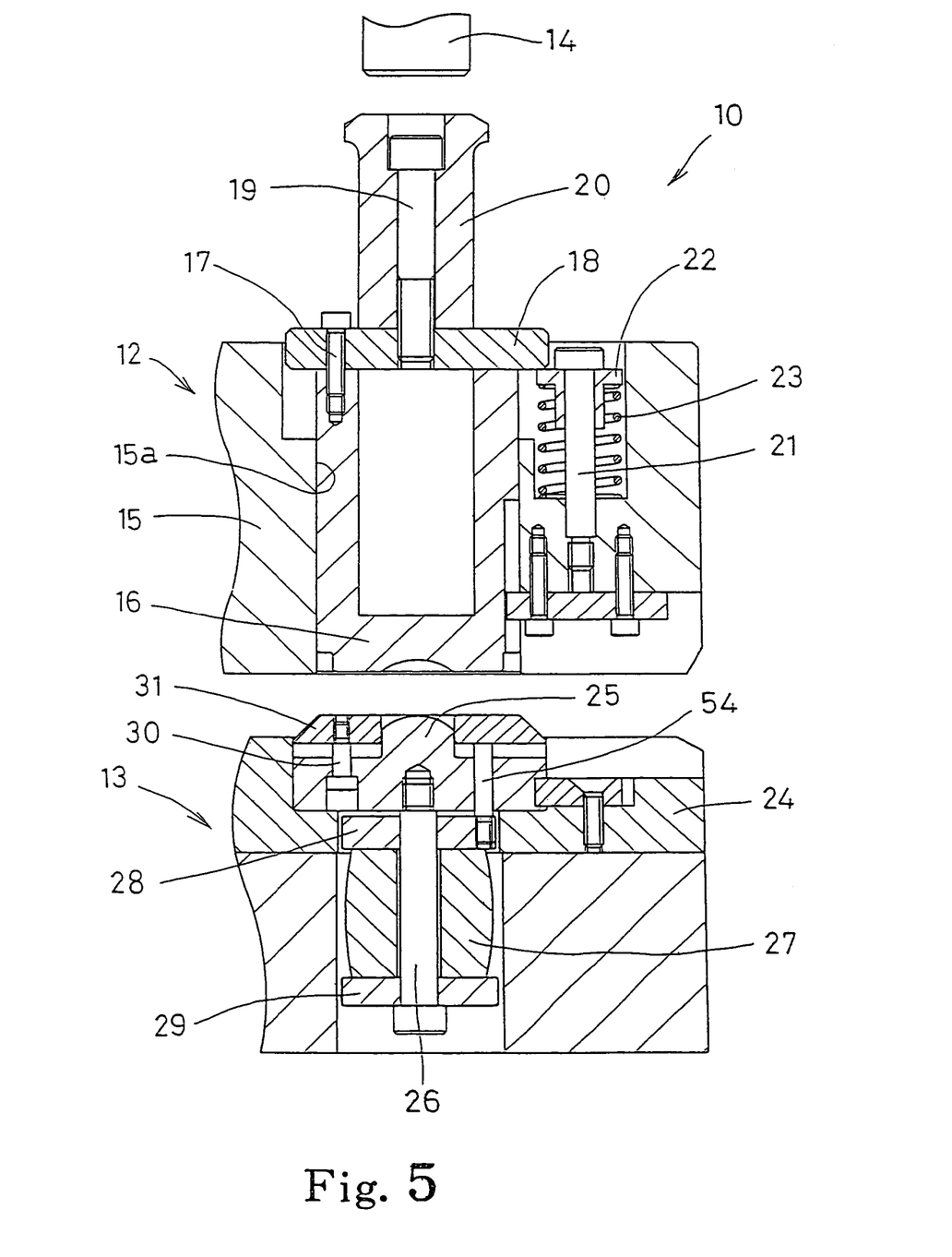
FIG. 5 is a sectional view of a first punching die unit when a striker moves up.
Figure 6:
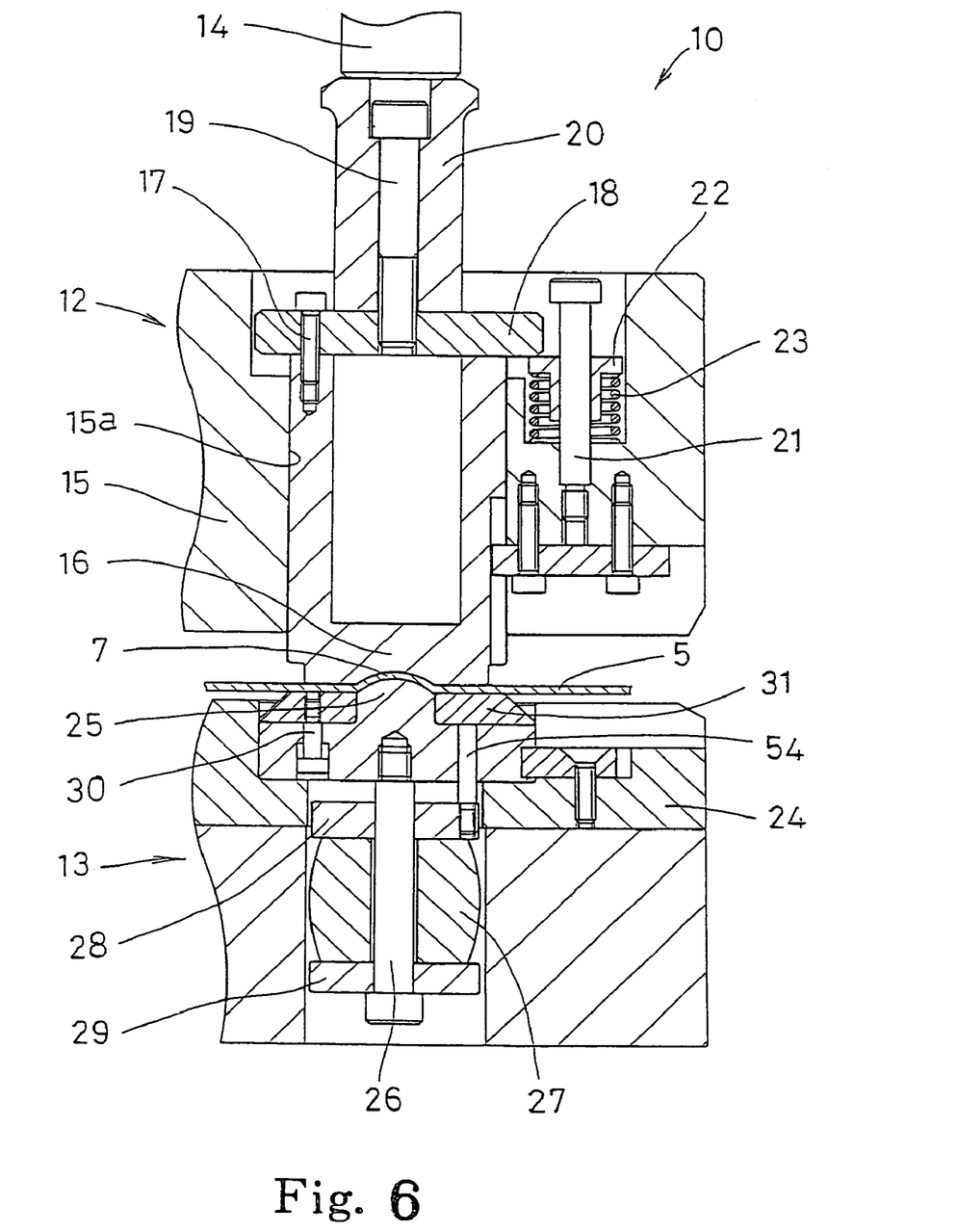
FIG. 6 is a sectional view of the first punching die unit when the striker moves down.

Namely, the first punching die unit 10 is for forming the protruding portion 7 on the steel plate 5, and comprises a punch assembly 12, a die assembly 13, and a striker 14. The punch assembly 12 comprises a punch 16 for forming a protruding portion, to be fitted in a guide hole 15a opened in an upper base 15 in a manner enabling it to move up and down, a flange 18 integrally attached to the upper end of the punch 16 via a bolt 17, a punch head 20 integrally attached to the upper side of the flange 18 via a bored bolt 19, a support member 22 which is supported by a guide bolt 21 fixed to the upper base 15 in a manner enabling it to move up and down, and comes into contact with the flange 18 from below, and a spring 23 which presses the support member 22 upward, etc. The die assembly 13 comprises a die 25 for forming a protruding portion, fixed to a lower base 24, a stripper bolt 26 which is fastened to the die 25 with the head downward, a urethane spring 27 through which the stripper bolt 26 is inserted, upper and lower collars 28, 29 through which the stripper bolt 26 is inserted while the collars are positioned at the upper side and the lower side, and an ejector plate 31 which is fixed to the upper collar 28 via an ejector bolt 54 and guided to the die 25 via a stopper bolt 30 in a manner enabling it to move up and down for a predetermined distance.

In the first punching die unit 10, while the striker 14 moves up, as shown in FIG. 5, the punch 16 is positioned at a moved-up position separated from the die 25, i.e., withdrawn inside the guide hole 15a of the upper base 15 because the support member 22 that has been retained at a predetermined position by the pressing force of the spring 23 is in contact with the flange 18 from below. Further, the ejector plate 31 is positioned by the pressing force of the urethane spring 27 so that the upper end of the ejector plate 31 is at almost the same height as the upper end of the die 25.

Figure 7:
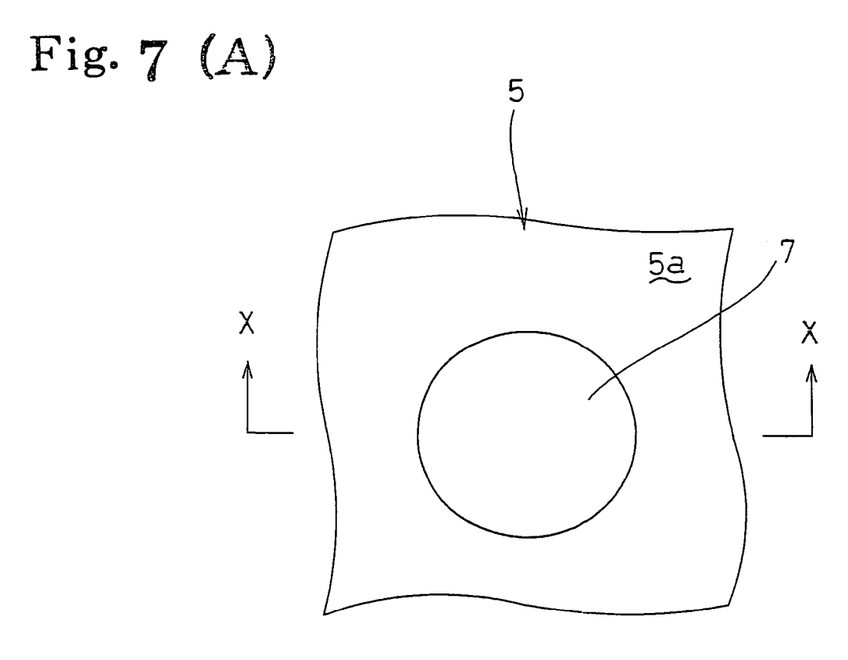
FIG. 7(A) is a plan view of a protruding portion after a first process is finished.
FIG. 7(B) is a 7B–7B sectional view of FIG. 7(A)

When the striker 14 is moved down, after the steel plate 5 is set between the punch 16 and the die 25 in a condition where the striker 14 is moved up, as shown in FIG. 6, the punch 16 moves down to project from the guide hole 15a, and a protruding portion 7 is formed on the steel plate 5 by being pressed by the punch 16 that has moved down and the die 25. At this point, the ejector plate 31 is moved down by being pressed by the punch 16 via the steel plate 5. Thereafter, in accordance with the moving-up of the punch 16 after forming the protruding portion 7, the ejector plate 31 is moved up by the pressing force of the urethane spring 27 to separate the steel plate 5 from the die 25.

Figure 8:
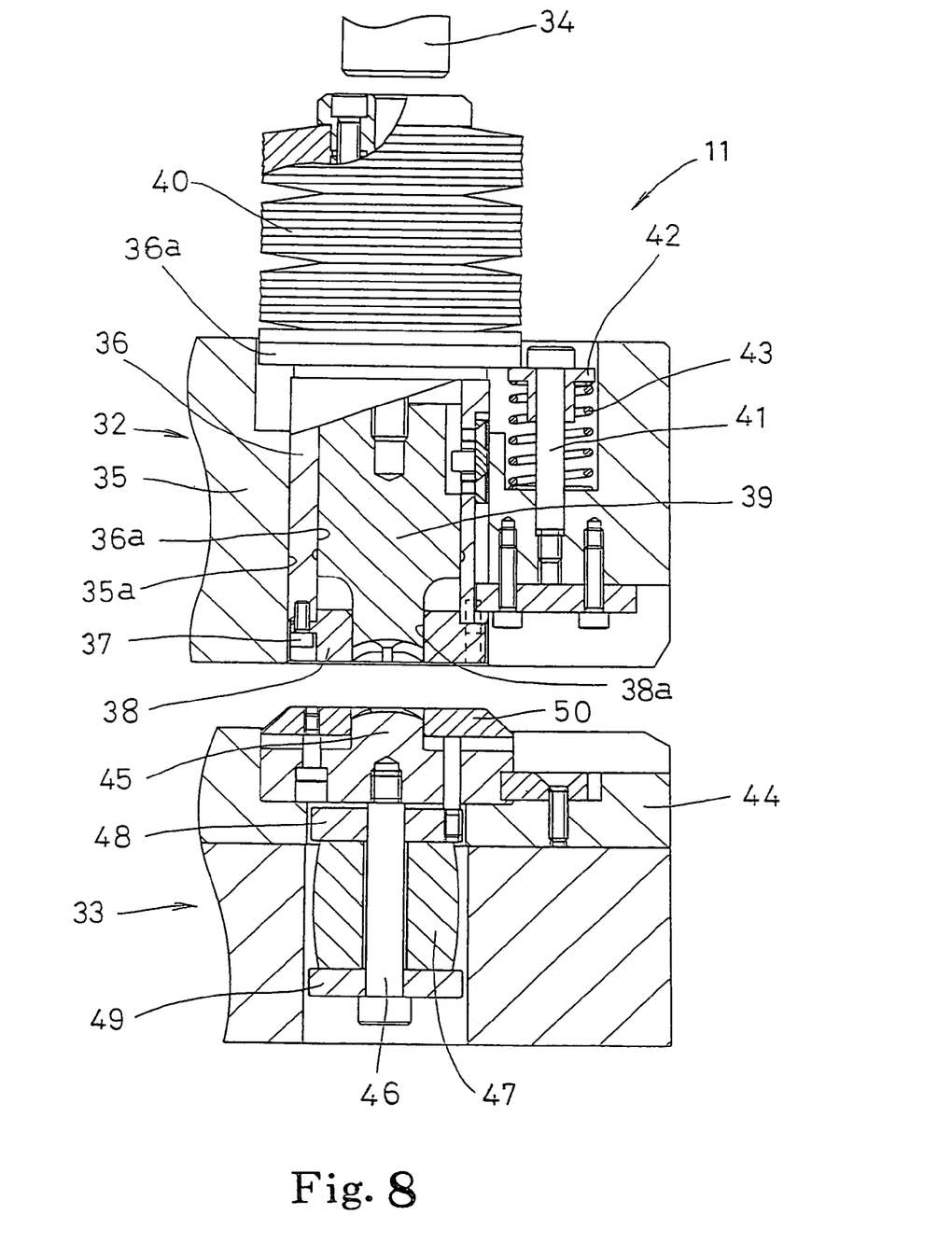
FIG. 8 is a sectional view of a second punching die unit when a striker moves up.
Figure 9:
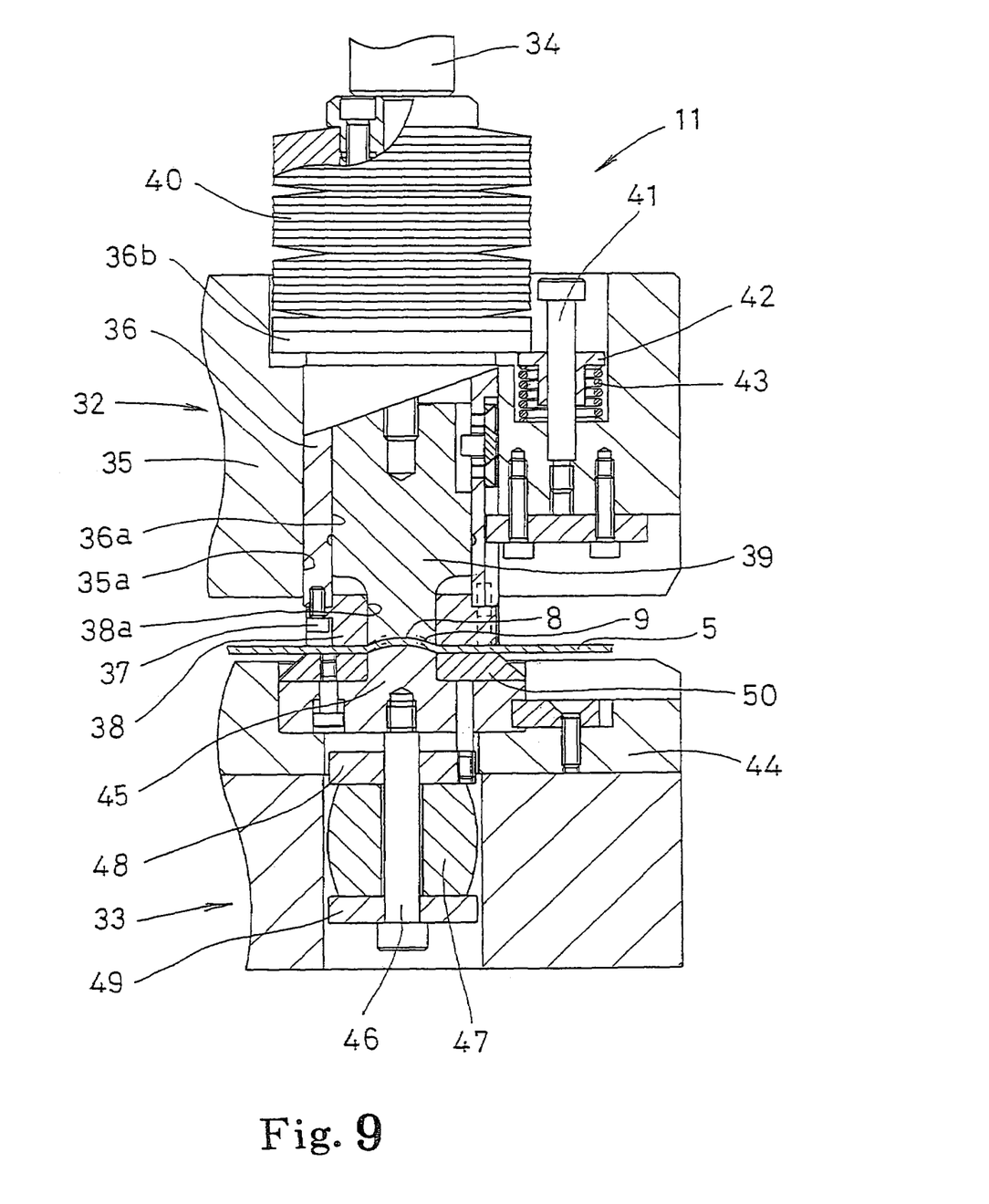
FIG. 9 is a sectional view of the second punching die unit when the striker moves down.

The second punching die unit 11 is for forming the concave portion 8 and the drain channels 9 in the protruding portion 7 formed by the first punching die unit 10. The second punching die unit 11 comprises, as in the case of the abovementioned first punching die unit 10, a punch assembly 32, a die assembly 33, and a striker 34. The punch assembly 32 of the second punching die unit 11 comprises a punch guide 36 which is fitted in a guide hole 35a opened in an upper base 35 in a manner enabling it to move up and down, a flange part 36b which is integrally formed at the upper end of the punch guide 36, a stripper plate 38 which is fastened to the lower end of the punch guide 36 via a stopper bolt 37, a punch 39 for forming a concave portion and drain channels, to be inserted through the cylindrical hole portions 36a, 38a opened in the punch guide 36 and the stripper plate 38 in a manner enabling it to move up and down so that the upper end projects upward from the flange part 36b, and a stripping spring 40 interposed between the upper end of the punch 39 and the flange part 36b, a support member 42, which is guided by a guide bolt 41 fixed to the upper base 35, in a manner enabling the support member 42 to move up and down, and comes into contact with the flange part 36b from below, and a spring 43 which presses the support member 42 upward, etc. The die assembly 33 comprises a die 45 for forming a concave portion and drain channels, fixed to the lower base 44, a stripper bolt 46 that is the same as in the first punching die unit 10, a urethane spring 47, upper and lower collars 48, 49, and an ejector plate 50, etc.

When the striker 34 moves up, in the second punching die unit 11, as shown in FIG. 8, the support member 42 is retained at a predetermined position by the pressing force of the spring 43 which is in contact with the flange part 36b from below. The punch guide 36 is positioned at a moved-up position separated from the die 45 so that the stripper plate 38 is withdrawn inside the guide hole 35a opened in the upper base 35. The punch 39 withdraws into the cylindrical hole portion 38a of the stripper plate 38 due to the pressing force of the stripping spring 40. Furthermore, the ejector plate 50 is positioned, by the pressing force of the urethane spring 47, so that the upper surface of the ejector plate 50 is at nearly the same height as that of the upper end of the die 45.

When the striker 34 is moved down, after the protruding portion 7 of the steel plate 5 is positioned between the punch 39 and the die 45 in a condition where the striker 34 is moved up, the punch 39 and the punch guide 36 move down together first, and accordingly, the stripper plate 38 projects downward from the guide hole 35a of the upper base 35 and the stripper plate 38 comes into contact with the upper surface 5a of the steel plate 5, whereby the steel plate upper surface 5a is pressed by the stripper plate 38. Next, the punch 39 moves down alone and the punch 39 that has moved down and the die 45 form the concave portion 8 and the drain channels 9 in the protruding portion 7. The inner circumferential surface of the concave portion 8 and the groove side surfaces of the drain channels 9 are formed by, as mentioned above, shear planes 8a, 9a that are substantially perpendicular to the upper surface 5a of the steel plate 5 and have been half-blanked so as not to open a through hole in the steel plate 5. In this case, by setting the clearance between the punch 39 and the die 45 edges to zero, acute edges can be formed at the upper edges of the shear plates 8a, 9a.

Further, when the punch 39 moves upwardly after the concave portion 8 and drain channels 9 are formed, the stripper plate 38 and the ejector plate 50 act to separate the steel plate 5 from the punch 39 and the die 45 as in the same manner as the ejector 31 of the first punching die unit 10 mentioned above.

In this embodiment, the first and second punching die units 10, 11 are attached to the turret of a turret punch press (not shown). The steel plate 5 is supported on the table of the turret punch press, and the second process for forming the concave portion 8 and the drain channels 9 is carried out successively from the first process by moving either the turret or the table for positioning of the punching die units relative to the steel plate 5.

In the abovementioned structure, at each slip stopping part 6, a concave portion 8 is formed at the central portion of the protruding portion 7 that protrudes in the plate thickness direction from the upper surface of the steel plate 5. Drain channels 9, shaped into concave grooves, are formed radially from the concave portion 8 so as to lead to the upper surface 5a of the steel plate 5. The concave portion 8 and drain channels 9 are formed by shear planes 8a, 9a that extend substantially perpendicular to the upper surface 5a of the steel plate 5 and have been half-blanked so as not to open a through hole in the steel plate 5. The shear planes 8a, 9a can achieve an excellent reliable slip stopping effect because their protrusions project from the steel plate upper surface 5a according to the protrusion height of the protruding portion 7, and the upper edges are acute. In this embodiment, the angles between each shear plane 8a and the upper surface of a protruding portion 7 and between each shear plane 9a and the upper surface of the protruding portion 7 becomes smaller to become a more acute angle as the inclination of the protruding portion 7 increases. Because as these angles become smaller to be a more acute angle more acute edges can be raised at the upper edges of the shear planes 8a, 9a, the slip stopping effect can be further improved.

In this structure because the shear planes 8a, 9a have been half-blanked so as not to open a through hole in the steel plate 5, problems, such as water or dirt entering inside the cover 2 or the tool box 3, the blowing up of heated air from an engine, and noise diffusion to the outside, can be prevented without the conventional double structure with a through hole opened, resulting in a significant cost reduction.

Further, in this structure because the drain channels 9 are formed to be inclined, the slip stopping effect is not lost by the accumulation of water or dirt in the concave portion 8, cleaning can be easily carried out even if dirt or dust accumulates in the concave portion 8 or the drain channels 9, and, as the groove side surfaces of the drain channels 9 are formed by shear planes 9a, the abovementioned slip stopping effect is further increased.

Thus, the slip stopping part 6 has a great slip stopping effect and does not open a through hole in the steel plate 5. To form this slip stopping part 6, the second process for forming the concave portion 8 and the drain channels 9 by the second punching die unit 11 is carried out after the first process for forming the protruding portion 7 by the first punching die unit 10.

As a result, the protruding portion 7 can be formed to be sufficiently high above the surface 5a of the steel plate 5, the stress to be applied to the steel plate 5 when shearing the protruding portion 7 by means of half blanking can be reduced, and acute edges can be raised at the upper edges of the shear planes 8a, 9a, whereby an excellent slip stopping effect can be achieved as mentioned above.

What is claimed is:

1. A method for manufacturing a slip stopper, comprising:
    forming a plurality of protruding portions on a metal plate so as to protrude in the plate thickness direction; and
    forming concave portions in the protruding portions defined by shear planes that extend substantially perpendicular to the plate surface of the metal plate to form a slip stopper and have been half-blanked from a protruding surface side of the protruding portions so as not to open through holes in the metal plate.

2. The method according to claim 1, further comprising:
    placing the metal plate between a punching assembly and a die assembly of a first punching die unit prior to forming the plurality of protruding portions; and
    relatively moving the metal plate relative to the first punching die unit and a second punching die unit after forming the plurality of protruding portions, to place the metal plate between a punch assembly and a die assembly of the second punching die unit.

3. The method according to claim 1, wherein the concave portions comprise a central concave portion and radial drain channels.

4. The method according to claim 3, wherein the central concave portion is depressed from an upper surface of the protruding portion and each drain channel has an upper surface at one end extending from an upper surface of the central concave portion and at the other end joining the plate surface of the metal plate.

5. An apparatus for manufacturing a slip stopper, comprising:
    a first punching die unit that forms a plurality of protruding portions on the surface of a metal plate so as to protrude in the plate thickness direction; and
    a second punching die unit that forms concave portions respectively in the protruding portions formed by the first punching die unit by creating shear planes that extend substantially perpendicular to the plate surface of the metal plate to form a slip stopper and have been half-blanked from a protruding surface side of the protruding portions so as not to open through holes in the metal plate.

6. The apparatus according to claim 5, wherein the first punching die unit comprises:
    a punch assembly having a punch with a concave face, a punch head, a punch body slideably holding the punch, and a retractor that biases the punch into a retracted position within the punch body;

a die assembly including a die having a convex face to oppose the concave face of the punch, a die body mounting the die, an ejector plate slideably mounted in the die body relative to the die; and a pushing member that pushes the ejector plate toward the punch body; and a striker.

7. The apparatus according to claim 6, wherein the second punching die unit comprises:

a punch assembly having a punch with a concave face having a central projection and radial projections, the radial projections having a decreasing height of projection from the central projection to no projection at the edge of the concave face, a punch body receiving the punch for reciprocal movement, a stripper plate slideably received on the punch adjacent the concave face, a first retractor that biases the punch into a retracted position within the punch body, and a second retractor that retracts the stripper plate within the punch body;

a die assembly comprising a die body, a die mounted in the die body and having a convex face substantially complementary to the concave face of the punch, an ejector plate slideably mounted in the die body relative to the die, and a pushing member that pushes the ejector plate toward the punch body; and a striker.

8. The apparatus according to claim 7, wherein the pushing member in each of the first punching die unit and the second punching die unit is a urethane spring.

9. The apparatus according to claim 7, wherein the retractor in each of the first punching die unit and the second punching die unit is a spring.

10. The apparatus according to claim 7, wherein the punch assembly of the first punching die unit further comprises a flange between the punch head and the punch, the punch head, flange and punch being assembled into a unitary structure.

11. The apparatus according to claim 5, wherein the second punching die unit comprises:

a punch assembly having a punch with a concave face having a central projection and radial projections, the radial projections having a decreasing height of projection from the central projection to no projection at the edge of the concave face, a punch body receiving the punch for reciprocal movement, a stripper plate slideably received on the punch adjacent the concave face, a first retractor that biases the punch into a retracted position within the punch body, and a second retractor that retracts the stripper plate within the punch body;

a die assembly comprising a die body, a die mounted in the die body and having a convex face substantially complementary to the concave face of the punch, an ejector plate slideably mounted in the die body relative to the die, and a pushing member that pushes the ejector plate toward the punch body; and a striker.

12. The apparatus according to claim 11, wherein the first punching die unit comprises:

a punch assembly having a punch with a concave face, a punch head, a punch body slideably holding the punch, and a retractor that biases the punch into a retracted position within the punch body;

a die assembly including a die having a convex face to oppose the concave face of the punch, a die body mounting the die, an ejector plate slideably mounted in the die body relative to the die; and a pushing member that pushes the ejector plate toward the punch body; and a striker.

13. The apparatus according to claim 12, wherein the pushing member in each of the first punching die unit and the second punching die unit is a urethane spring.

14. The apparatus according to claim 12, wherein the retractor in each of the first punching die unit and the second punching die unit is a spring.

15. The apparatus according to claim 12, wherein the punch assembly of the first punching die unit further comprises a flange between the punch head and the punch, the punch head, flange and punch being assembled into a unitary structure.

* * * * *